Aug. 25, 1925.
J. P. KELLY
1,551,491
PULSATING CYLINDER LUBRICATOR
Filed July 19, 1924
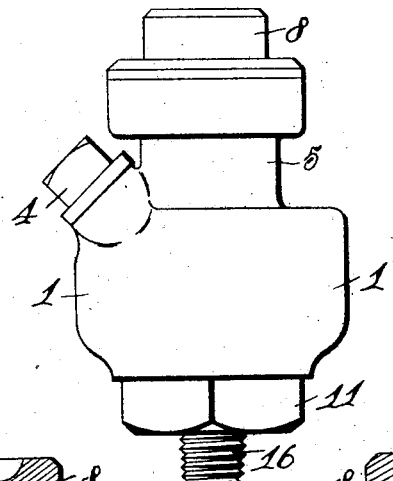
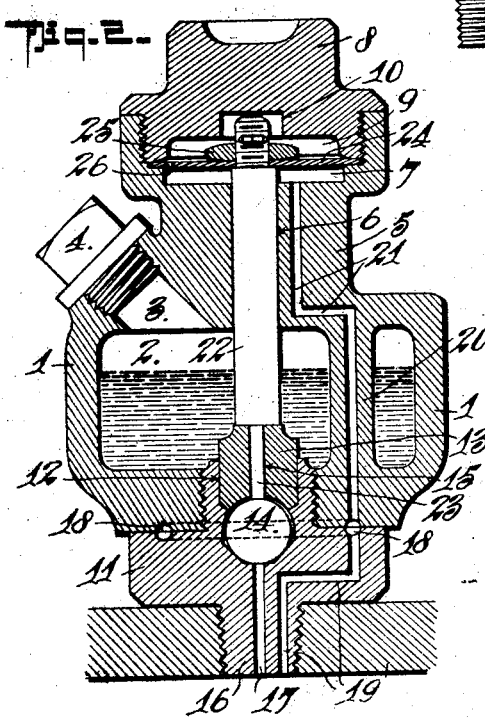
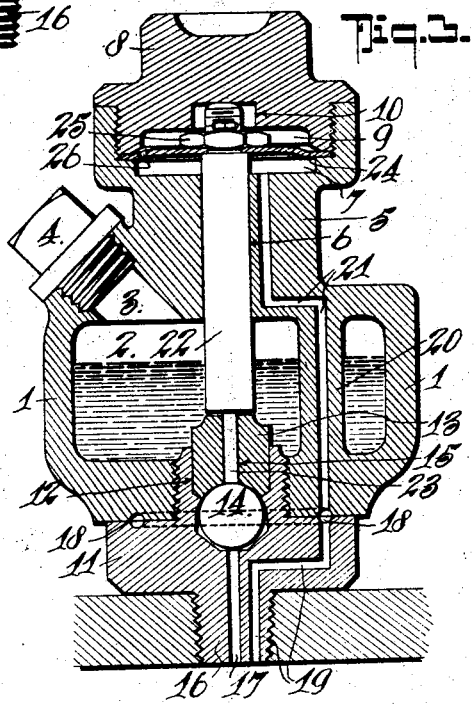
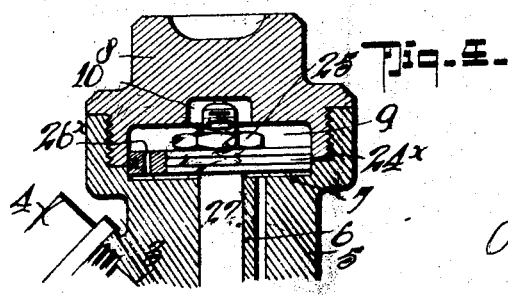
INVENTOR
JOHN P. KELLY
BY
ATTORNEYS Patented Aug. 25, 1925.

1,551,491

UNITED STATES PATENT OFFICE.

JOHN P. KELLY, OF PITTSFIELD, MASSACHUSETTS.

PULSATING CYLINDER LUBRICATOR.

Application filed July 19, 1924. Serial No. 727,016.

*To all whom it may concern:*

Be it known that I, JOHN P. KELLY, a citizen of the United States, residing at Pittsfield, in the county of Berkshire and State of Massachusetts, have invented a new and Improved Pulsating Cylinder Lubricator, of which the following is a specification.

My invention relates to the art of lubrication and it particularly has for its objects the provision of a simple, inexpensively constructed lubricator that is fully automatic in its action, has provision for adjusting itself according to the viscosity of the lubricant (caused by variations in temperature) so as to deliver always no more than the desired or required amount of lubricant, and one that is complete in itself and requires no outside piping or connections to parts of the air compressor other than that to which it delivers the oil.

Another object of the invention is to provide a lubricator of the character mentioned in which provision is made to warm the oil in the chamber or reservoir to an extent sufficient to prevent such congealing of the lubricant in cold weather as might interfere with the efficient operation of the device.

With other objects in view, which will hereinafter appear, the invention resides in those novel constructions, combinations and arrangements of parts, all of which will hereinafter be fully described, then be specifically pointed out in the appended claims and illustrated in the accompanying drawings, in which:

Figure 1 is a side elevation of my invention.

Figure 2 is a longitudinal section of the same, the parts being in the position assumed during the suction stroke of the compressor to which the lubricator is attached.

Figure 3 is a view similar to Figure 2 showing the position of the parts during the compression stroke of the air cylinder's-piston.

Figure 4 is a detail sectional view of a modification.

In the drawing, in which like numerals of reference designate like parts in all of the figures, 1 is the casing or body chambered at 2 to constitute an oil reservoir and provided with a filling passage 3 normally closed by a filling plug 4.

The body 1 has a neck 5 bored to provide a valve stem guide 6 for the stem 22 of the pulsating-valve.

7—9 designates the diaphragm or piston chamber lower and upper portions respectively, while 8 indicates the diaphragm chamber cap nut.

The nut 8 has a valve stem receiving recess 10 into which the upper end of the stem 22 projects, the upper end being reduced in diameter and threaded to form a shoulder and receive the securing nut 25 that holds the diaphragm 24 in place.

11 designates the bottom closure nut and compressor connection and 12 indicates a socket in the nut's shank into which the pulsating valve seat member 13 is tightly fitted.

14 is a ball check valve located in a ball containing chamber with which the valve seat passage 15 communicates and from which the oil passes by gravity, when the ball 14 is raised, through the oil feed passage 17 in the threaded boss 16 of the bottom closure nut and compressor connection 11.

The body 1 and nut 11 have matching annular grooves 18 with which the air conduit 19 in the nut 11 communicates, and with which the duct 21 in the body 1 is also in communication. The duct 21 includes a column 20 passing through the oil reservoir 2 and communicates at its upper end with the lower diaphragm chamber portion 7 beneath the diaphragm 24.

The oil feeder-valve comprises the stem portion 22 and the reduced valve stem portion 23, which latter portion operates in the valve seat passage 15, it being understood that there is sufficient clearness between the parts 15 and 23 to enable the oil to work down into the chamber containing the check ball 14 when the feeder-valve 22—23 has pulsated or reciprocated.

The diaphragm 24 is provided with a small aperture or equalizing port, 26 the purpose for which will presently appear.

Instead of using a diaphragm 24, a packed piston 24× (see Figure 4) may be employed, if found desirable.

*Operation.*

The operation of the device is as follows: To fill the lubricator, remove the filling plug 4 and pour in the oil in the usual manner until it appears at the top of the filling aperture, then replace the filling plug, being careful to set it up moderately tight with the wrench.

With the lubricator applied to the compressor and with the latter working, when the air compressor piston (not shown) is advancing toward the end to which the lubricator is applied, compressing the air in front of it, the air in the diaphragm chamber air conduit 19—21 is compressed and forced upwardly into the diaphragm lower chamber 7 where it forms pressure beneath the diaphragm or piston and lifts it until the diaphragm or piston end of the oil feeder-valve stem strikes against the diaphragm chamber cap nut 8 in the top of the recess 10.

While the pressure is forming in the diaphragm lower chamber 7 and lifting the oil feeder-valve, air flows through the small feed port 26 in the diaphragm, or past the edge of the piston, if an unpacked piston is used, or through the port 26×, if a packed piston is used (see Figure 4) and quickly charges the diaphragm upper chamber 9 to equilibrium with the lower chamber 7 so that gravity causes the oil feeder-valve to seat and close communication between the oil reservoir and the oil feeding passage 17.

Simultaneously with the compresser air piston strokes the ball check valve closes the oil passage against admission of compressed air to the oil feed valve, and opens this passage for the flow of oil, measured into the oil passage by the oil feed valve, to the air cylinder.

The diaphragm (or piston) carrying stem 22 is made of a metal which has a greater coefficient of expansion than that of the metal of which the lubricator body and the diaphragm cap nut are made, so that as the lubricator heats up the lift of the oil feeder-valve is automatically diminished. This provides for reduction in the quantity of oil supplied to the air cylinder when the oil becomes thin from heating and thus prevents at any time a too copious feeding.

On the other hand, on account of the shape of the oil reservoir and on account of the fact that the oil feeder-valve stem is encased in a long close fitting guide 6, congealing of the oil at the center of the reservoir in cold weather is prevented, this prevention being aided by the conducted heat from the surface of the column 20 absorbed from the compressed air in the duct 21, and a moderate air pressure is maintained on the surface of the oil that forces the congealed portion of the oil next to the reservoir walls downwardly toward the oil feed valve, so that there may be no interruption of the feed when the temperature is low.

It is quite obvious that although the oil feeder-valve will ordinarily seat by gravity yet when the air compressor piston is moving away from the end of the air cylinder to which the lubricator is applied, the pressure is suddenly reduced in the diaphragm lower chamber considerably below that in the diaphragm upper chamber so that the differential between these two chambers acting downwardly in conjunction with gravity for a moment on the diaphragm or piston causes a positive seating of the oil feeder-valve.

By means of the choice of a suitable relationship between the area of the oil feed valve on its seat and the clearance about its oil feed passage extension, and the lift of the feeder-valve, perfect mechanical control of the rate of feed per stroke of air piston may be secured.

From the foregoing description, taken in connection with the accompanying drawing, it is thought the construction, combination and advantages of the invention will be clear to those skilled in the art.

It will also be noted that with my lubricator, the same feeds oil only when the compressor is working and at the same rate as the piston strokes.

What I claim is:

1. In pulsating cylinder-lubricators, a body having a chamber constituting an oil reservoir, a pulsating oil feeder-valve, means for automatically varying the action of the feeder-valve to vary the oil feed from the reservoir according to the temperature thereof, and means governed by the pressure within the cylinder to be lubricated for effecting the pulsation of said feeder-valve.

2. In pulsating cylinder-lubricators, a body having a chamber constituting an oil reservoir, a pulsating oil feeder-valve, means for automatically varying the action of the feeder-valve to vary the oil feed from the reservoir according to the temperature thereof, means governed by the pressure within the cylinder to be lubricated for effecting the pulsation of said feeder-valve, means for heating the oil within said chamber to maintain it in the liquid state.

3. In pulsating lubricators for air cylinders having pistons, and the like, a body having a chamber constituting an oil reservoir, an oil outflow passage from said chamber, a feeder-valve controlling said passage, said passage including a ball chamber, a ball check valve in said ball chamber adapted to close off the flow of oil out of said reservoir and cut off the admission of compressed air into the oil reservoir during the pressure stroke of the compressor piston, and to close off the oil flow into the air cylinder during the suction stroke of the compressor piston, and means governed by changes of pressure in the air cylinder for reciprocating the feeder-valve.

4. In pulsating lubricators for air cylinders having pistons, and the like, a body having a chamber constituting an oil reservoir, an oil outflow passage from said chamber, a feeder-valve controlling said passage, said passage including a ball chamber, a ball check valve in said ball chamber adapted to close off the flow of oil out of said reservoir and cut off the admission of compressed air into the oil reservoir during the pressure stroke of the compressor piston, and to close off the oil flow into the air cylinder during the suction stroke of the compressor piston, means governed by changes of pressure in the air cylinder for reciprocating the feeder-valve, and means for automatically varying the stroke of said feeder-valve according to the temperature of the lubricant.

5. In pulsating cylinder-lubricators, a body having a chamber constituting an oil reservoir, a pulsating feeder-valve, means for effecting reciprocation of said valve, said body having a discharge passage controlled by said feeder-valve through which the lubricant passes out of the reservoir, means in said discharge passage for closing said passage against pressure flow from the air cylinder during the compression stroke of the piston, said means comprising a check valve in the passage from the reservoir to the cylinder and adapted to seat in two directions.

6. In pulsating cylinder-lubricators, a body having a chamber constituting an oil reservoir, said body having a neck provided with a feeder-valve stem guide, said body having an opening at its bottom, a bottom closure nut and compressor connection secured in said opening, and provided with a socket and an oil feed passage including a ball chamber, a ball in said ball chamber, a pulsating valve seat member in said socket and having a valve passage, a feeder-valve having a portion operating in said passage and adapted to close said passage when in one position, said body having a diaphragm chamber, a diaphragm chamber cap nut closing the same from atmosphere, and a member on said feeder-valve within said diaphragm chamber for imparting pulsations to said feeder-valve, and a duct through said body from said compressor connection to the bottom of said diaphragm chamber for the purposes described.

7. In pulsating cylinder-lubricators, a body having a chamber constituting an oil reservoir, said body having a neck provided with a feeder-valve stem guide, said body having an opening in its bottom, a bottom closure nut and compressor connection secured in said opening, and provided with a socket and an oil feed passage including a ball chamber, a ball in said ball chamber, a pulsating valve seat member in said socket and having a valve passage, a feeder-valve having a portion operating in said passage and adapted to close said passage when in one position, said body having a diaphragm chamber, a diaphragm chamber cap nut closing the same from atmosphere, a member on said feeder-valve within said diaphragm chamber for imparting pulsations to said feeder-valve, a duct through said body from said compressor connections to the bottom of said diaphragm chamber, said body and said feeder-valve having provision for differential expansion whereby as the parts become heated the stroke of the feeder-valve will proportionately be reduced for the purposes specified.

8. In pulsating cylinder-lubricators, a body having a chamber constituting an oil reservoir, a pulsating oil-feeder-valve located within said body, means for automatically varying the action of the feeder-valve to vary the oil fed from the reservoir according to the temperature thereof, and means governed by the fluctuations of pressure within the cylinder to be lubricated for effecting a pulsating action of said feeder-valve.

JOHN P. KELLY.